Patented Jan. 8, 1946

2,392,346

UNITED STATES PATENT OFFICE 2,392,346

WRINKLE FINISH

William A. Waldie, Dayton, Ohio, assignor to New Wrinkle, Inc., Dayton, Ohio, a corporation of Ohio No Drawing. Application January 31, 1942,
Serial No. 429,115

19 Claims. (Cl. 260—19)

This invention relates to wrinkle varnish composition, and more particularly deals with a wrinkle finish produced from oils such as linseed oil without blowing of the oil.

Hitherto the preparation of wrinkle compositions has been considered to require the use of China-wood oil, oiticica oil, and other similar drying oils containing conjugated double bonds, or mixtures of them. These oils, or mixtures, were generally used either in their raw or natural state, or subsequent to preliminary treatment as by blowing, depending on the particular characteristics required in the finished product and the nature of the individual oil or mixture of oils used.

It has also been known hitherto that drying oils possessing unconjugated double bonds in their structure could be employed in the formulation of wrinkle compositions if they were to be submitted to a blowing operation for the purpose of causing them to combine, at least in part, with the oxygen in the air. Such blown oils, however, offer certain disadvantages in view of the fact that a substantial amount of air is absorbed by the oil and remains chemically uncombined. This absorbed air appears to become intermolecularly dispersed, with the result that auto-oxidation occurs during storage and gelling and precipitation of the oil takes place.

More recently use has been made of blown dehydrated castor oil as a substitute for the costly drying oils previously used in the preparation of wrinkle composition.

Still more recently wrinkle varnishes have been produced by chemically combining unblown drying type oil with oil soluble resin and air at elevated temperature. The wrinkle compositions resulting from this procedure do not exhibit the tendency to gel and precipitate which is commonly present when blown oils are used, and this is believed to be due to the fact that the reaction temperature employed is so much higher than normally used in blowing operations that the oxygen which is not chemically combined is driven out instead of being held dispersed in the oil.

According to the present invention, I am able to produce a wrinkle composition from oils such as linseed oil without either blowing the oil prior to use or blowing the varnish during the cooking operation. My present invention is thus a faster and more economical manner of producing wrinkle compositions.

As typical examples of formulations and procedures according to my invention, but without thereby limiting myself to the specific details of procedure and proportions indicated, the following illustrative examples are given:

Example I

| | | |
|---|---|---|
| Modified phenol aldehyde resin | lbs | 100–125 |
| Polycarboxylic acid | lbs | 1.5–2.5 |
| Linseed type oil | gals | 12–20 |
| Hydrocarbon solvent | gals | 22–30 |
| Cobalt drier | gal | 0.75–1 |

In preparing the wrinkle composition of my invention from the aforementioned components, the oil and resin are heated to approximately 400° F. and held at that temperature until the resin is thoroughly dispersed. Thereupon, there is added to the batch the polycarboxylic acid and the temperature is increased to approximately 550° F. The batch is held at this temperature until it attained the desired body or viscosity. A satisfactory viscosity or end point may be considered to have been reached when a drop falls from a stirring rod with a slight thread-like filament while hot. When this condition has been reached the mixture is withdrawn from the fire, allowed to cool to approximately 400° F., and the solvent and drier added thereto.

Example II

| | | |
|---|---|---|
| Amberol F7 | lbs | 100 |
| Maleic anhydride | lbs | 2 |
| Varnish linseed oil | gallons | 15 |
| Mineral spirits | do | 5 |
| Solvesso #2 | do | 16 |
| Nuodex cobalt 6% | do | ¾ |

Example III

| | | |
|---|---|---|
| Amberol F7 | lbs | 100 |
| Maleic anhydride | lbs | 2 |
| Varnish linseed oil | gallons | 15 |
| Mineral spirits | do | 5 |
| Toluol or xylol | do | 16 |
| Nuodex cobalt 6% | do | ¾ |

Example IV

| | | |
|---|---|---|
| Amberol F7 | lbs | 100 |
| Maleic anhydride | lbs | 2 |
| Perilla oil | gallons | 15 |
| Mineral spirits | do | 5 |
| Solvesso #2 | do | 16 |
| Nuodex cobalt 6% | do | ¾ |

Example V

| | | |
|---|---|---|
| Amberol F7 | lbs | 100 |
| Maleic anhydride | lbs | 2 |
| Perilla oil | gallons | 15 |
| Mineral spirits | do | 5 |
| Xylol or toluol | do | 16 |
| Nuodex cobalt 6% | do | ¾ |

In preparing the wrinkle composition of my invention from the components set forth in Examples II, III, IV and V, substantially the same procedure may be followed as in Example I.

It will be understood by those skilled in the art that "mineral spirits" is that grade of petroleum product of either a paraffinic or naphthenic origin which is commonly known in the trade as a turpentine substitute, while Solvesso #2 is a hydrogenated naphtha having a volatility similar to that of xylol and manufactured by Standard Oil Company. Nuodex cobalt 6% is a cobalt naphthenate drier solution in which the metallic cobalt amounts to about 6%.

Those skilled in the art will know that Amberol F7 is a rosin modified phenol-formaldehyde type of resin and that, therefore, other oil soluble and non-reactive phenol-aldehyde resins of the same general characteristics may be used in the practice of my invention. These include resins known by trade names such as Beckacite, Durez, Para-dura, Durite, Locto, Paranol, Varcum, etc. In every case an oil soluble and non-reactive quality must be employed. The term "non-reactive" is used in the sense employed by Siddle in "Varnish Making," 1940 (Chemical Publishing Co., pages 121 and 122). By "reactivity" is meant the liberation of water and formaldehyde on cooking with drying oils.

The selection of thinners which may be employed in the practice of my invention is not critical, although preference should be given to those products of high volatility such as toluol, xylol, light naphtha, etc. Of course, a small quantity of low volatile solvent may prove of value to bring about a sudden chilling of a batch in the event that it should body a trifle more than necessary or required.

Many different driers may be used, but preference should be given to those commonly known as "top driers" and which tend to form the surface skin which is so desirable in wrinkle compositions. The resinate, linoleate and naphthenate type of drier, characterized by ready solubility, proves very suitable for this purpose.

While I have given examples using varnish grade linseed oil and perilla oil, it will be understood that other like oils having the general characteristics of these oils, and mixtures thereof, may be used, the choice depending primarily on availability and cost.

The choice of resin to be used will depend on the desired characteristics of the wrinkle varnish base. As has been noted hereinbefore, rosin modified phenol-aldehyde resin may be used satisfactorily in the practice of my invention. Rosin modified alkyd resin such as maleic acid resin may be used likewise, and it will be understood that other polybasic acids or their anhydrides, including phthalic, tartaric, citric and malic may be substituted for maleic acid or maleic anhydride in the practice of my invention.

Furthermore, natural resins such as Congo, Kauri, Batu, Zanzibar, oil soluble Manila, Pontianak, etc., may be employed, but where such natural resins are used, they should first be "run" to make them oil soluble and the first step of the procedure hereinbefore described would have to be altered accordingly. In such case, for example, the resin would first be fused and the oil would then be added to it. The necessity for pretreating the natural resin will be fully appreciated by those skilled in the art.

It will be understood that metal driers other than cobalt compounds may be used, as, for example, those of manganese. The inherent characteristic of the drier to be used is its ability to bring about a rapid formation of a skin on the exposed surface of the film in order to cause the changes in volume between the surface of the film and the interior thereof which lead to the production of a wrinkle surface.

The wrinkle compositions produced according to the method of my invention may be further compounded with pigment ground in oil vehicle for the purpose of producing wrinkle enamels, and texture modifying ingredients of various sorts may be added thereto.

It will be noted by those skilled in the art that the major significance of this invention resides in the use of unblown oils of a type (linseed type) which the skill and teachings of the art have always considered impossible to use in the preparation of wrinkle varnishes. For example, no one acquainted with and skilled in the art of manufacturing wrinkle coating compositions would have considered the use of unblown linseed oil exclusively in the manufacture of such compositions; in fact, the teachings of the prior art clearly set forth that linseed oil and other similar oils act as inhibitors of wrinkle formation and should not be used in the preparation of wrinkle coating compositions except in very small amounts. It is clearly evident that the practice of this invention leads to a new, novel and unexpected result.

Furthermore, it will be noted that the type of oil employed in the practice of my invention is obtainable plentifully from domestic sources and is of stable price and quality. This is an additional advantage of great significance and value to the industry since it is freed from dependence on foreign sources of supply and from the necessity of using wrinkling oils such as tung oil and oiticica oil, the quality, cost and availability of which widely fluctuate.

Wrinkle compositions such as result from the practice of my invention are adapted to be sprayed and then baked at a temperature of from 200 to 250° F. for approximately one hour to produce a wrinkle finish of pleasing and uniform texture and exhibiting a satisfactory degree of toughness and hardness.

It will be understood that while I have set forth herein certain specific embodiments of my invention, it is not my intention to have my invention limited to or circumscribed by the specific details of procedure and proportions indicated in view of the fact that my invention is adapted to changes according to individual preference and conditions without departing from the scope thereof as defined in the appended claims.

I claim:
1. The method of making a wrinkle composition which comprises heating from 100 to 125 pounds of rosin modified phenol-aldehyde resin and from 12 to 20 gallons of unblown drying oil which in its native state is of the non-conjugated double-bonded type at a temperature of approximately 400° F. for time sufficient thoroughly to disperse the resin in the oil, adding to the mixture from 1.5 to 2.5 pounds of maleic anhydride, increasing the temperature to approximately 500° F. and holding to body, cooling to approximately 400° F., and adding thereto from 0.75 to 1 gallon of cobalt drier solution and from 22 to 30 gallons of hydrocarbon solvent, whereby a sprayable composition adapted to produce a uniform wrinkle finish when applied to a surface and baked is obtained.

2. A wrinkle composition consisting of the heat reaction product of oil soluble resin selected from the group consisting of run natural resins requiring running for the production of oil solubility, rosin-modified alkyd resins, and phenol-aldehyde resins which do not evolve formaldehyde and water on cooking with drying oil, unblown drying oil which in its native state is of the non-conjugated double-bonded type, and 1.5 to 2.5 pounds of a polycarboxylic acid per each 100 pounds of resin in admixture with drier and thinner; the composition having been produced by first heating the mixture of oil and resin to approximately 400° F., then adding the polycarboxylic acid and heating to approximately 550° F.

3. A wrinkle composition consisting of the heat reaction product of oil-soluble resin selected from the group consisting of run natural resins requiring running for the production of oil solubility, rosin-modified alkyd resins, and phenol-aldehyde resins which do not evolve formaldehyde and water on cooking with drying oil, unblown drying oil which in its native state is of the non-conjugated double-bonded type, and 1.5 to 2.5 pounds of a polycarboxylic acid per each 100 pounds of resin in admixture with cobalt drier and thinner; the composition having been produced by first heating the mixture of oil and resin to approximately 400° F., then adding the polycarboxylic acid and heating to approximately 550° F.

4. A wrinkle composition consisting of the heat reaction product of rosin-modified phenol-aldehyde resin, unblown drying oil which in its native state is of the non-conjugated double-bonded type and 1.5 to 2.5 pounds of a polycarboxylic acid per each 100 pounds of resin in admixture with drier and thinner; the composition having been produced by first heating the mixture of oil and resin to approximately 400° F., then adding the polycarboxylic acid and heating to approximately 550° F.

5. A wrinkle composition consisting of the heat reaction product of rosin-modified phenol-aldehyde resin, unblown drying oil which in its native state is of the non-conjugated double-bonded type, and 1.5 to 2.5 pounds of a polycarboxylic acid per each 100 pounds of resin in admixture with cobalt drier and thinner; the composition having been produced by first heating the mixture of oil and resin to approximately 400° F., then adding the polycarboxylic acid and heating to approximately 550° F.

6. A wrinkle composition consisting of the heat reaction product of rosin-modified phenol-aldehyde resin, unblown perilla oil, and 1.5 to 2.5 pounds of maleic anhydride per each 100 pounds of resin in admixture with a top drier and thinner; the composition having been produced by first heating the mixture of oil and resin to approximatelly 400° F., then adding the maleic anhydride and heating to approximately 550° F.

7. A wrinkle composition consisting of the heat reaction product of rosin-modified phenol-aldehyde resin, unblown perilla oil, and 1.5 to 2.5 pounds of maleic anhydride per each 100 pounds of resin in admixture with a top drier and hydrocarbon solvent; the composition having been produced by first heating the mixture of oil and resin to approximately 400° F., then adding the maleic anhydride and heating to approximately 550° F.

8. The method of making a wrinkle composition which consists in heat reacting oil-soluble resin selected from the group consisting of run natural resins requiring running for the production of oil solubility, rosin-modified alkyd resins, and phenol-aldehyde resins which do not evolve formaldehyde and water on cooking with drying oil and unblown drying oil which in its native state is of the non-conjugated double-bonded type at approximately 400° F., adding 1.5 to 2.5 pounds of a polycarboxylic acid per each 100 pounds of resin, and heating to approximately 550° F., and then adding to the reaction product drier and thinner.

9. The method of making a wrinkle composition which consists in heat reacting oil-soluble resin selected from the group consisting of run natural resins requiring running for the production of oil solubility, rosin-modified alkyd resins, and phenol-aldehyde resins which do not evolve formaldehyde and water on cooking with drying oil and unblown drying oil which in its native state is of the non-conjugated double-bonded type at approximately 400° F., adding 1.5 to 2.5 pounds of maleic anhydride per each 100 pounds of resin and heating to approximately 550° F., and then adding to the reaction product cobalt drier and thinner.

10. The method of making a wrinkle composition which consists in heat reacting rosin-modified phenol-aldehyde resin and unblown drying oil which in its native state is of the non-conjugated double-bonded type at approximately 400° F., adding 1.5 to 2.5 pounds of maleic anhydride per each 100 pounds of resin and heating to approximately 550° F., and then adding to the reaction product drier and thinner.

11. The method of making a wrinkle composition which consists in heat reacting rosin-modified phenol-aldehyde resin and unblown drying oil which in its native state is of the non-conjugated double-bonded type at approximately 400° F., adding 1.5 to 2.5 pounds of maleic anhydride per each 100 pounds of resin, and heating to approximately 550° F., and then adding to the reaction product cobalt drier and thinner.

12. The method of making a wrinkle composition which consists in heat reacting rosin-modified phenol-aldehyde resin and unblown perilla oil at approximately 400° F., adding 1.5 to 2.5 pounds of maleic anhydride per each 100 pounds of resin and heating to approximately 550° F., and then adding to the reaction product a top drier and thinner.

13. The method of making a wrinkle composition which consists in heat reacting rosin-modified phenol-aldehyde resin and unblown perilla oil at approximately 400° F., adding 1.5 to 2.5 pounds of a polycarboxylic acid per each 100 pounds of resin and heating to approximately 550° F., and then adding to the reaction product a top drier and hydrocarbon solvent.

14. The method of making a wrinkle composition which consists in heat reacting 100 to 125 pounds of rosin-modified phenol-aldehyde resin with 12 to 20 gallons of unblown drying oil which in its native state is of the non-conjugated double-bonded type at approximately 400° F., adding 1.5 to 2.5 pounds of maleic anhydride, and heating to approximately 550° F., and then adding to the reaction product from 0.75 to 1 gallon of cobalt drier solution and from 22 to 30 gallons of thinner.

15. The method of making a wrinkle composition which consists in heat reacting from 100 to 125 pounds of rosin-modified phenol-aldehyde resin with 12 to 20 gallons of linseed oil at approximately 400° F., adding from 1.5 to 2.5 pounds of maleic anhydride and heating to approximately 550° F., and then adding to the reaction product from 0.75 to 1 gallon of cobalt drier solution and from 22 to 30 gallons of hydrocarbon solvent.

16. A wrinkle composition consisting of the heat reaction product of from 100 to 125 pounds of rosin-modified phenol-aldehyde resin, from 12 to 20 gallons of unblown drying oil which in its native state is of the non-conjugated double-bonded type and from 1.5 to 2.5 pounds of polycarboxylic acid in admixture with from 0.75 to 1 gallon of cobalt drier solution and from 22 to 30 gallons of hydrocarbon solvent; the composition having been produced by first heating the mixture of oil and resin to approximately 400° F., then adding the polycarboxylic acid and heating to approximately 550° F.

17. A wrinkle composition consisting of the heat reaction product of from 100 to 125 pounds of rosin-modified phenol-aldehyde resin, from 12 to 20 gallons of unblown perilla oil and from 1.5 to 2.5 pounds of maleic anhydride in admixture with from 0.75 to 1 gallon of cobalt drier solution and from 22 to 30 gallons of hydrocarbon solvent; the composition having been produced by first heating the mixture of oil and resin to approximately 400° F., then adding the maleic anhydride and heating to approximately 550° F.

18. A wrinkle composition consisting of the heat reaction product of rosin-modified phenol-aldehyde resin, linseed oil, and 1.5 to 2.5 pounds of maleic anhydride per each 100 pounds of resin in admixture with a top drier and thinner; the composition having been produced by first heating the mixture of oil and resin to approximately 400° F., then adding the maleic anhydride and heating to approximately 550° F.

19. A wrinkle composition consisting of the heat reaction product of rosin-modified phenol-aldehyde resin, linseed oil, and 1.5 to 2.5 pounds of maleic anhydride per each 100 pounds of resin in admixture with a top drier and hydrocarbon solvent; the composition having been produced by first heating the mixture of oil and resin to approximately 400° F., then adding the maleic anhydride and heating to approximately 550° F.

WILLIAM A. WALDIE.